US012768981B2

(12) United States Patent
Nakano

(10) Patent No.: US 12,768,981 B2
(45) Date of Patent: Oct. 20, 2026

(54) COMMUNICATION APPARATUS, COMMUNICATION SYSTEM, AND KEY OPENING/CLOSING CONTROLLING METHOD

(71) Applicant: Sony Semiconductor Solutions Corporation, Kanagawa (JP)

(72) Inventor: Hiroaki Nakano, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 332 days.

(21) Appl. No.: 18/016,741

(22) PCT Filed: Jun. 22, 2021

(86) PCT No.: PCT/JP2021/023623
§ 371 (c)(1),
(2) Date: Jan. 18, 2023

(87) PCT Pub. No.: WO2022/038890
PCT Pub. Date: Feb. 24, 2022

(65) Prior Publication Data
US 2023/0314590 A1 Oct. 5, 2023

(30) Foreign Application Priority Data
Aug. 17, 2020 (JP) ................................ 2020-137218

(51) Int. Cl.
*G01S 13/84* (2006.01)
*E05B 49/00* (2006.01)
(Continued)

(52) U.S. Cl.
CPC .............. *G01S 13/84* (2013.01); *E05B 49/00* (2013.01); *E05B 81/78* (2013.01); *G01S 13/765* (2013.01)

(58) Field of Classification Search
CPC ........ G01S 13/84; G01S 13/765; E05B 49/00; E05B 81/78; G07C 9/00309; G07C 2209/63
See application file for complete search history.

(56) References Cited

U.S. PATENT DOCUMENTS

2001/0005170 A1 6/2001 Heide
2006/0208169 A1* 9/2006 Breed ..................... G01S 15/88 250/221

(Continued)

FOREIGN PATENT DOCUMENTS

JP H06021864 A 1/1994
JP H09297171 A 11/1997

(Continued)

OTHER PUBLICATIONS

Olafsdottir Hildur et al: "On the Security of Carrier Phase-Based Ranging", Aug. 25, 2017 (Aug. 25, 2017), Topics in Cryptology—CT-RSA 2020 : The Cryptographers' Track at the RSA Conference 2020, San Francisco, CA, USA, Feb. 24-28, 2020, Cornell University Library, 201 Olin Library Cornell University Ithaca, NY 14853, pp. 490-509, XP047562052.

(Continued)

*Primary Examiner* — Vladimir Magloire
*Assistant Examiner* — Anna K. Gosling
(74) *Attorney, Agent, or Firm* — Michael Best & Friedrich LLP

(57) ABSTRACT

A positioning relation taking an obstacle between communication apparatuses into consideration is grasped to perform opening/closing control with a key.
The communication apparatus includes a distance generation section and an inside/outside determination section. The distance generation section generates distance information on the basis of a phase characteristic of a frequency of a propagation channel to and from another communication (Continued)

apparatus. The inside/outside determination section performs inside/outside determination on whether or not an obstacle is interposed between the communication apparatus and the difference communication apparatus, on the basis of the phase characteristic of the frequency of the propagation channel to and from the other communication apparatus. The communication apparatus may further include a key controlling section that controls at least one of locking and unlocking with a key on the basis of the distance information and a result of the inside/outside determination.

21 Claims, 15 Drawing Sheets

(51) Int. Cl.
*E05B 81/78* (2014.01)
*G01S 13/76* (2006.01)

(56) References Cited

U.S. PATENT DOCUMENTS

| | | | | |
|---|---|---|---|---|
| 2011/0090061 | A1 | 4/2011 | Hofer | |
| 2018/0252805 | A1* | 9/2018 | Leconte | G01S 13/825 |
| 2018/0267155 | A1* | 9/2018 | Shimizu | G01S 17/32 |
| 2020/0053689 | A1 | 2/2020 | McQueen | |
| 2020/0217947 | A1* | 7/2020 | Stitt | B60R 25/248 |
| 2020/0309932 | A1* | 10/2020 | Zeng | G07C 5/08 |
| 2020/0309941 | A1* | 10/2020 | Makari | G01S 5/0218 |

FOREIGN PATENT DOCUMENTS

| | | | | |
|---|---|---|---|---|
| JP | 2000111638 | A | 4/2000 | |
| JP | 2007195154 | A | 8/2007 | |
| JP | 2008304192 | A | 12/2008 | |
| JP | 2012237712 | A | 12/2012 | |
| JP | 2014084595 | A | 5/2014 | |
| JP | 2014513271 | A | 5/2014 | |
| JP | 2017183834 | A | 10/2017 | |
| JP | 2018527509 | A | 9/2018 | |
| JP | 2018155725 | A | 10/2018 | |
| JP | 2019176437 | A | 10/2019 | |
| JP | 2020026970 | A | 2/2020 | |
| JP | 2020046321 | A | 3/2020 | |
| JP | 2020507082 | A | 3/2020 | |
| KR | 100809353 | B1 | 3/2008 | |
| KR | 20110049731 | A | 5/2011 | |
| WO | WO-2018129158 | A1 * | 7/2018 | G01S 13/84 |

OTHER PUBLICATIONS

International Search Report (PCT/ISA/210), International Application No. PCT/JP2021/023623, dated Sep. 21, 2021.

* cited by examiner a b a b a b

FIG. 9

| AVERAGE AMPLITUDE (RATIO) | PRECEDING WAVE COMPONENT | DELAYED WAVE COMPONENT | SECOND DELAYED WAVE COMPONENT |
|---|---|---|---|
| | -1m ~ 3m | 3m ~ 8m | 8m ~ 13m |
| OUTSIDE DOOR | -13.69<br>(1. 00) | -23.05<br>(0. 59) | -39.02<br>(0. 35) |
| INSIDE DOOR | -21.77<br>(1. 00) | -19.60<br>(1. 11) | -22.72<br>(0. 96) |

COMMUNICATION APPARATUS, COMMUNICATION SYSTEM, AND KEY OPENING/CLOSING CONTROLLING METHOD

TECHNICAL FIELD

The present technology relates to a communication apparatus. Particularly, the present technology relates to a commination apparatus and a communication system that generate a positional relation between communication apparatuses and an opening/closing controlling technology with a key that utilizes the communication apparatus and the communication system.

BACKGROUND ART

In recent years, a virtual key according to which a portable terminal such as a smartphone is used as an imaginary key has been attracting attention. The virtual key is one of services that utilize an application program of a portable terminal and a communication line or short range wireless communication to perform unlocking or locking of a vehicle, engine starting, or the like. This service makes it possible to temporarily give a key, for example, to a particular person other than an owner of the key, and improvement in security arising from that exchange of the key becomes unnecessary and improvement in convenience in car sharing are expected. Further, also it is possible to disable the function of the key when the portable terminal is stolen or lost. From such conveniences as just described, further spreading of the virtual key is expected also in the future.

In this virtual key, if it is simply devised such that it measures the distance and performs unlocking if the distance is short, then there is a possibility that such unlocking is performed even from the inside, which causes a problem in regard to the security. Therefore, for example, there has been proposed a technique which determines whether the virtual key is in the inside or the outside of a house on the basis of a reception state of GPS (Global Positioning System) signals (for example, refer to PTL 1.)

CITATION LIST

Patent Literature

[PTL 1]
Japanese Patent Laid-Open No. Hei 9-297171

SUMMARY

Technical Problem

In the existing technology described above, GPS signals are used to determine whether the virtual key is in the inside or the outside of a house. However, since the reception state of GPS signals changes significantly depending upon the positional relation of satellites, surrounding environment, and weather, the determination accuracy is low, and there is a possibility that malfunction occurs.

The present technology has been devised taking such a situation as described above into consideration, and it is an object of the present technology to grasp a positioning relation taking an obstacle between communication apparatuses into consideration, to appropriately perform opening/closing control with a key.

Solution to Problem

The present technology has been made in order to solve the problem described above, and according to a first aspect of the present technology, there is provided a communication apparatus including a distance generation section that generates distance information on the basis of a phase characteristic of a frequency of a propagation channel to and from another communication apparatus, and an inside/outside determination section that performs inside/outside determination on whether or not an obstacle is interposed between the communication apparatus and the difference communication apparatus, on the basis of the phase characteristic, and a communication system that includes the communication apparatus. This brings about an effect of generating distance information and a result of inside/outside determination which are based on the phase characteristic of the frequency of the propagation channel.

Further, in the first aspect, the inside/outside determination section may extract a predetermined feature amount from the phase characteristic and perform the inside/outside determination on the basis of the feature amount. This brings about an effect of performing inside/outside determination on the basis of the feature amount extracted from the phase characteristic.

Further, in the first aspect, the inside/outside determination section may generate a time response characteristic from the phase characteristic and perform the inside/outside determination on the basis of the time response characteristic. This brings about an effect of performing inside/outside determination on the basis of the time response characteristic generated from the phase characteristic.

Further, in the first aspect, the inside/outside determination section may perform the inside/outside determination on the basis of a relation between a preceding wave and a delayed wave in the time response characteristic. Especially, the inside/outside determination section may perform the inside/outside determination on the basis of a component ratio between a preceding wave and a delayed wave in the time response characteristic.

Further, in the first aspect, the distance generation section may generate the distance information on the basis of group delay information generated from the phase characteristic. This brings about an effect of generating distance information on the basis of the group delay information.

Further, in the first aspect, the communication apparatus may further include a phase measurement section that measures the phase characteristic by transmission and reception to and from the other communication apparatus. This brings about an effect of measuring a phase characteristic with the other communication apparatus.

Further, in the first aspect, the communication apparatus may further include multiple antennae used for transmission and reception to and from the other communication apparatus, and the phase measurement section may measure the phase characteristic through each of the multiple antennae to generate multiple phase characteristics, the distance generation section may generate the distance information on the basis of each of the multiple phase characteristics, and the inside/outside determination section may perform the inside/outside determination on the basis of each of the multiple phase characteristics. This brings about an effect of improving the accuracy of the distance information and a result of the inside/outside determination by utilizing the multiple phase characteristics measured by the multiple antennae. In this case, the communication apparatus may further include an antenna switching section that sequentially switches the multiple antennae.

Further, in the first aspect, the communication apparatus may further include a key controlling section that controls at least one of locking and unlocking with a key on the basis of the distance information and a result of the inside/outside determination. This brings about an effect of performing locking or unlocking by using the key provided in the communication apparatus.

Meanwhile, according to a second aspect of the present technology, there is provided a key opening/closing controlling method for a communication apparatus, including a procedure, by a distance generation section, of generating distance information on the basis of a phase characteristic of a frequency of a propagation channel to and from another communication apparatus, a procedure, by an inside/outside determination section, of performing inside/outside determination on whether or not an obstacle is interposed between the communication apparatus and the other communication apparatus, on the basis of the phase characteristic, and a procedure, by a key controlling section, of controlling at least one of locking and unlocking with a key on the basis of the distance information and a result of the inside/outside determination. This brings about an effect of performing opening/closing control with the key by utilizing the distance information and a result of the inside/outside determination which are based on the phase characteristic of the frequency of the propagation channel.

BRIEF DESCRIPTION OF DRAWINGS

FIG. 9 is a table depicting an example of an average amplitude value of the time response characteristic utilized in the inside/outside determination section 192 according to the first embodiment of the present technology.

DESCRIPTION OF EMBODIMENTS

In the following, modes for carrying out the present technology (each hereinafter referred to as an embodiment) are described. The description is given in the following order.

1. First Embodiment (example of phase measurement through one antenna)
2. Second Embodiment (example of phase measurement through two antennae)

1. First Embodiment

[Communication Apparatus]

Figure 1:
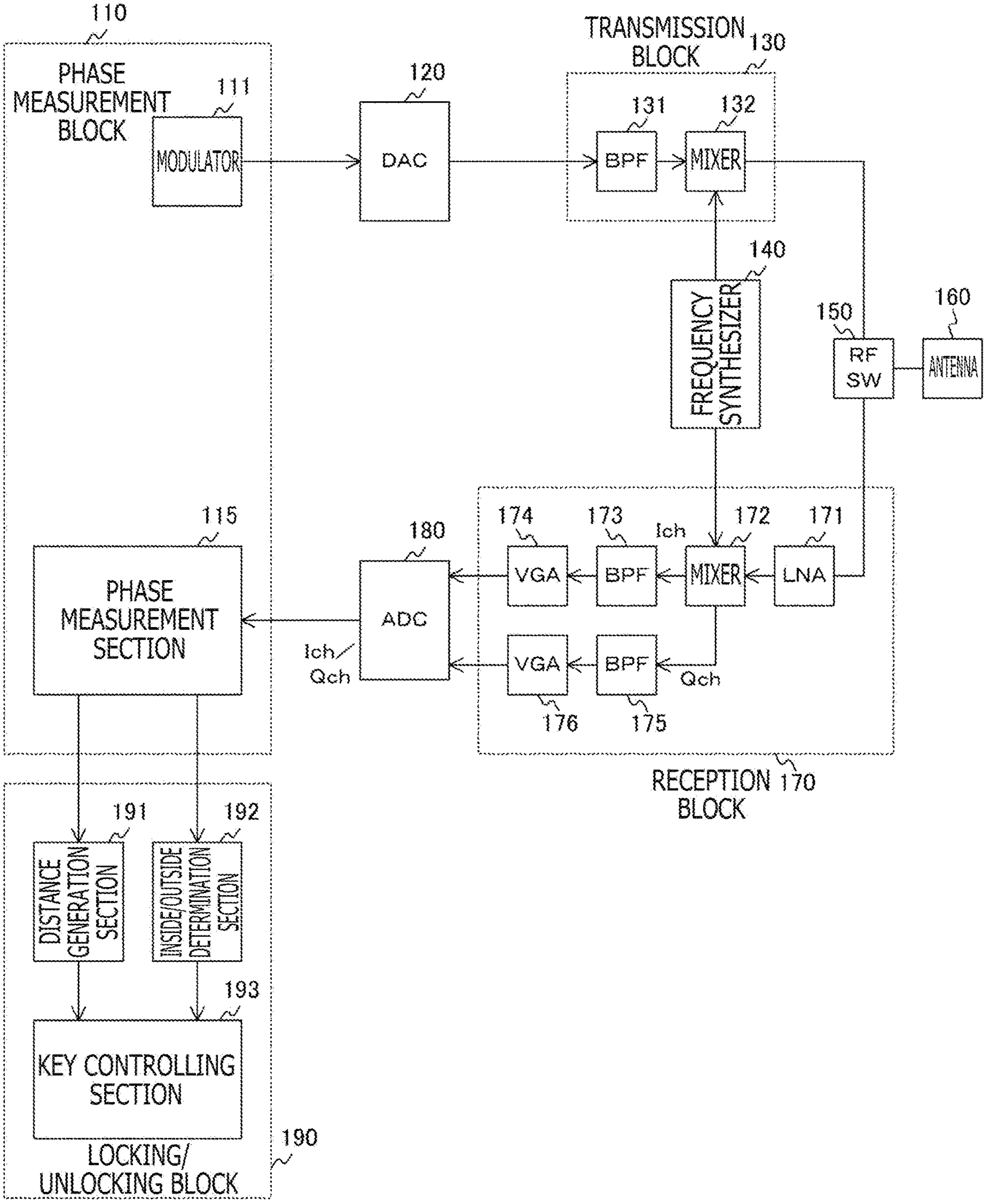
FIG. 1 is a diagram depicting an example of a configuration of a communication apparatus according to a first embodiment of the present technology.

FIG. 1 is a diagram depicting an example of a configuration of a communication apparatus according to a first embodiment of the present technology.

The communication apparatus includes a phase measurement block 110, a DAC 120, a transmission block 130, a frequency synthesizer 140, an RF switch 150, an antenna 160, a reception block 170, an ADC 180, and a locking/unlocking block 190.

The phase measurement block 110 is a block that measures a phase characteristic of a frequency of a propagation channel to and from another communication apparatus. The phase measurement block 110 includes a modulator 111 and a phase measurement section 115. Meanwhile, the locking/unlocking block 190 includes a distance generation section 191, an inside/outside determination section 192, and a key controlling section 193.

The modulator 111 performs a modulation process on a signal for performing communication. In the following description, it is supposed that IQ modulation is performed as an example of the modulation process. In the IQ modulation, signals of the I channel (In-phase: in-phase component) and the Q channel (Quadrature: quadrature component) are used as a baseband signal.

The DAC (Digital-to-Analog Converter) 120 converts a digital signal supplied from the modulator 111 into an analog signal. The analog signal converted by the DAC 120 is supplied to the transmission block 130.

The transmission block 130 is a block that transmits a signal by wireless communication. The transmission block 130 includes a BPF 131 and a mixer 132. The BPF (Band-Pass Filter) 131 is a filter that passes only a signal in a specific frequency band therethrough. The BPF 131 supplies only a signal in the specific frequency band from within an analog signal supplied from the DAC 120 to the mixer 132. The mixer 132 mixes a local oscillation frequency supplied from the frequency synthesizer 140, into the signal supplied from the BPF 131 to convert the signal into a signal of a transmission frequency of wireless communication.

The frequency synthesizer 140 supplies a frequency to be used upon transmission and reception. The frequency synthesizer 140 includes a local oscillator in the inside thereof and is used for conversion between a radio frequency signal and a baseband signal of wireless communication.

The RF switch 150 is a switch that switches a radio frequency (RF) signal. The RF switch 150 connects, upon transmission, the transmission block 130 to the antenna 160 but connects, upon reception, the reception block 170 to the antenna 160. The antenna 160 is an antenna for performing transmission and reception by wireless communication.

The reception block 170 is a block that receives a signal by wireless communication. The reception block 170 includes an LNA 171, a mixer 172, BPFs 173 and 175, and VGAs 174 and 176.

The LNA (Low Noise Amplifier) 171 is an amplifier that amplifies an RF signal received by the antenna 160. The mixer 172 mixes a local oscillation frequency supplied from the frequency synthesizer 140, into the signal supplied from the LNA 171 to convert the signal into signals of the I channel and the Q channel. The signal of the I channel is supplied to the BPF 173, and the signal of the Q channel is supplied to the BPF 175. The BPFs 173 and 175 are filters that pass only a signal in a specific frequency band therethrough similarly to the BPF 131. The VGAs (Variable Gain Amplifier) 174 and 176 are analog variable gain amplifiers that adjust the gain of signals from the BPFs 173 and 175, respectively.

The ADC (Analog-to-Digital Converter) 180 converts signals of the I channel and the Q channel from the VGAs 174 and 176 supplied from analog signals into digital signals.

The phase measurement section 115 measures a phase characteristic of the frequency of a propagation channel to and from another communication apparatus. The phase measurement section 115 measures a phase characteristic of a frequency on the basis of data of the signals of the I channel and the Q channel supplied from the ADC 180.

The distance generation section 191 generates distance information on the basis of the phase characteristic of the frequency measured by the phase measurement section 115. Since the gradient of the relation between the frequency and the phase rotation amount indicates delay time of a distance measurement signal, the distance between the communication apparatuses can be calculated by multiplying the delay time by the velocity of light.

The inside/outside determination section 192 performs inside/outside determination on whether or not an obstacle is interposed between the communication apparatus and another communication apparatus, on the basis of the phase characteristic of the frequency measured by the phase measurement section 115. Various techniques are available for this inside/outside determination, and therefore, details of the inside/outside determination are hereinafter described.

The key controlling section 193 controls at least one of locking and unlocking with a key on the basis of the distance information generated by the distance generation section 191 and a result of the inside/outside determination by the inside/outside determination section 192.

It is to be noted that, although the example of the configuration in which the locking/unlocking block 190 is included in the communication apparatus is described here, functions corresponding to all or some of the components of the locking/unlocking block 190 may be placed in other apparatuses.

Figure 2:
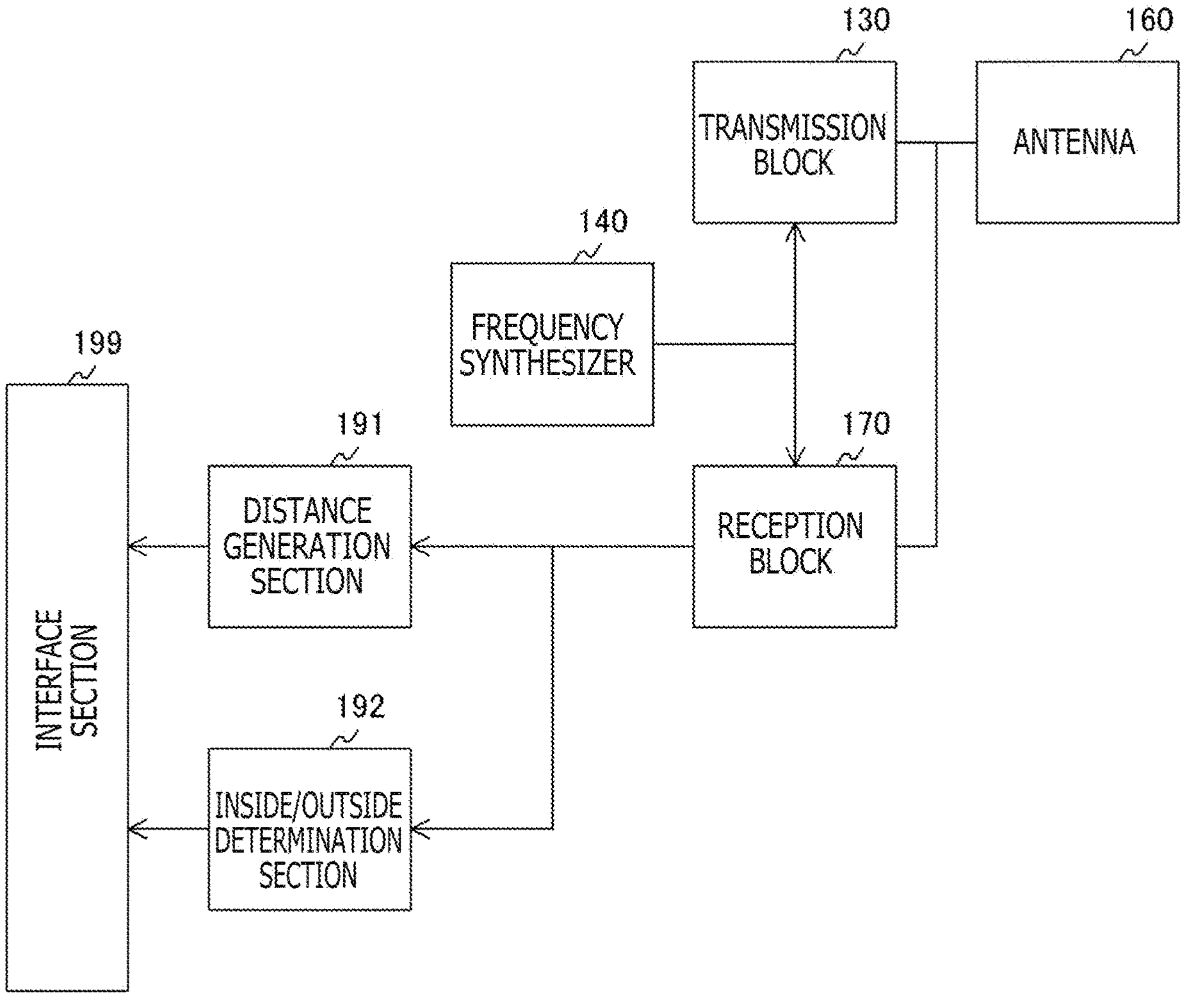
FIG. 2 is a diagram depicting an example of a block configuration of the communication apparatus according to the first embodiment of the present technology.

FIG. 2 is a diagram depicting an example of a block configuration of the communication apparatus according to the first embodiment of the present technology. Though not depicted, the example of the block configuration also includes the phase measurement block 110 described hereinabove.

In the example of the block configuration, it is supposed that, while the distance generation section 191 and the inside/outside determination section 192 of the locking/unlocking block 190 are provided in the communication apparatus, control with a key is performed by an external apparatus. Therefore, the communication apparatus includes an interface section 199 that performs exchange of a signal by wireless or wired communication with the external apparatus.

[Phase Measurement]

Figure 3:
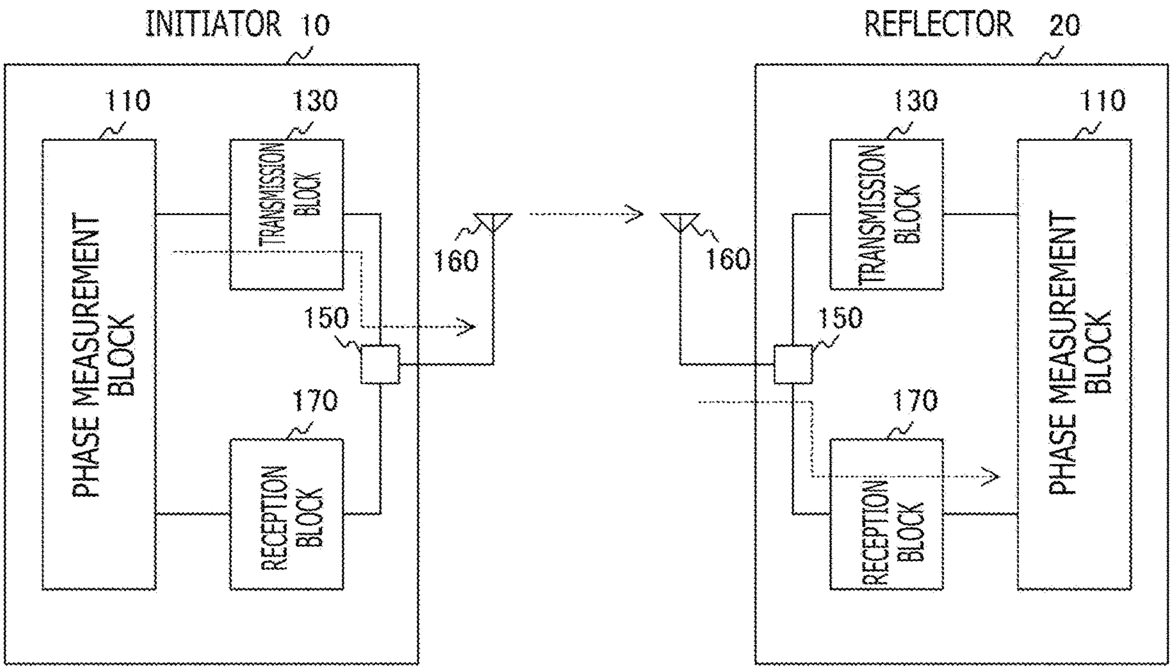
FIG. 3 is a diagram depicting an example of a mode of phase measurement according to the first embodiment of the present technology.
Figure 3:
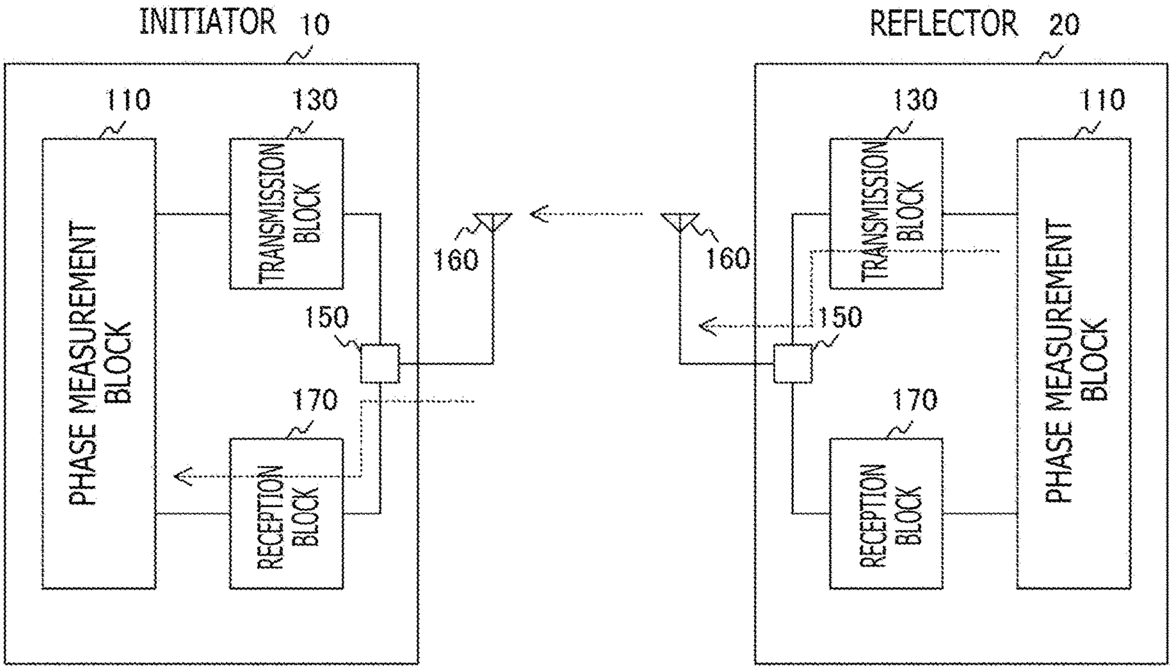

FIG. 3 is a diagram depicting an example of a mode of phase measurement according to the first embodiment of the present technology.

When a phase between communication apparatuses is to be measured, first, a measurement signal is transmitted from one communication apparatus (initiator 10) to the other communication apparatus (reflector 20) as depicted in "a" of FIG. 3. The communication apparatuses described above can be used as any of the initiator 10 or the reflector 20.

In this example, only major blocks are depicted. In particular, in the initiator 10, a measurement signal from the phase measurement block 110 is transmitted from the antenna 160 through the transmission block 130. Meanwhile, in the reflector 20, the measurement signal is received by the reception block 170 through the antenna 160.

Then, as depicted in "b" of FIG. 3, the measurement signal is transmitted back from the reflector 20 to the initiator 10. In particular, in the reflector 20, the measurement signal from the phase measurement block 110 is transmitted from the antenna 160 through the transmission block 130. Further, in the initiator 10, the measurement signal is received by the reception block 170 through the antenna 160, and the phase characteristic between the initiator 10 and the reflector 20 is measured by the phase measurement block 110.

By performing round-trip communication in the manner described above, a phase characteristic between the communication apparatuses can be measured.

[Distance Information Generation]

Figure 4:
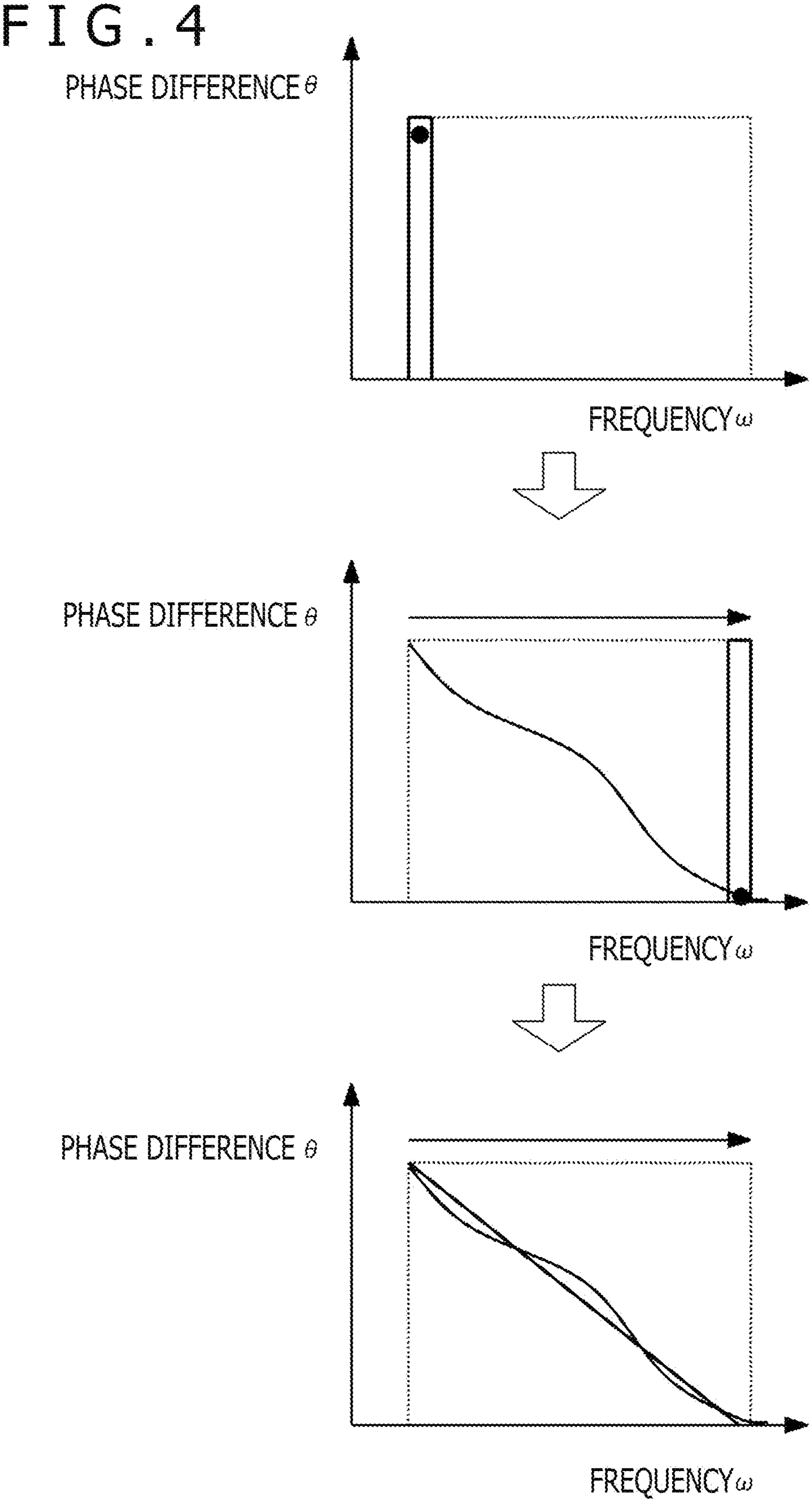
FIG. 4 is a diagram depicting an example in which distance information is generated from a phase characteristic by a distance generation section 191 according to the first embodiment of the present technology.

FIG. 4 is a diagram depicting an example in which the distance generation section 191 according to the first embodiment of the present technology generates distance information from a phase characteristic.

As depicted in FIG. 4, when the axis of abscissa indicates a frequency ω, and the axis of ordinate indicates a phase difference θ, the phase difference θ changes substantially linearly according to the frequency. A group delay τ can be calculated from the gradient of the phase difference. The group delay τ is obtained by differentiation of the phase difference θ between the input waveform and the output waveform by the angular frequency ω. Since a phase cannot be distinguished from another phase displaced by an integer multiple of 2π therefrom, the group delay is used as an index representing a characteristic of a filter circuit.

When the phase difference between a transmission signal and a reception signal is represented by θd, the measurement phase by θm, the distance of the propagation channel 30 by D, and the velocity of light by c (=299792458 m/s), the following expression is satisfied.

$$\theta d(=\theta m+2\pi n)=\omega td=\omega\times 2D/c$$

By differentiating the opposite sides of the expression above by the angular frequency ω, the following expression is obtained.

$$d\theta d/d\omega = d\theta m/d\omega = 2D/c$$

By transforming the expression above, the distance D can be calculated by the following expression.

$$D = (c/2) \times (d\theta m/d\omega)$$

Accordingly, if the phase is measured and the gradient of the phase (differentiated value by the angular frequency ω) is found, then distance information can be generated on the basis of the phase characteristic.

[Inside/Outside Determination]

Figure 5:
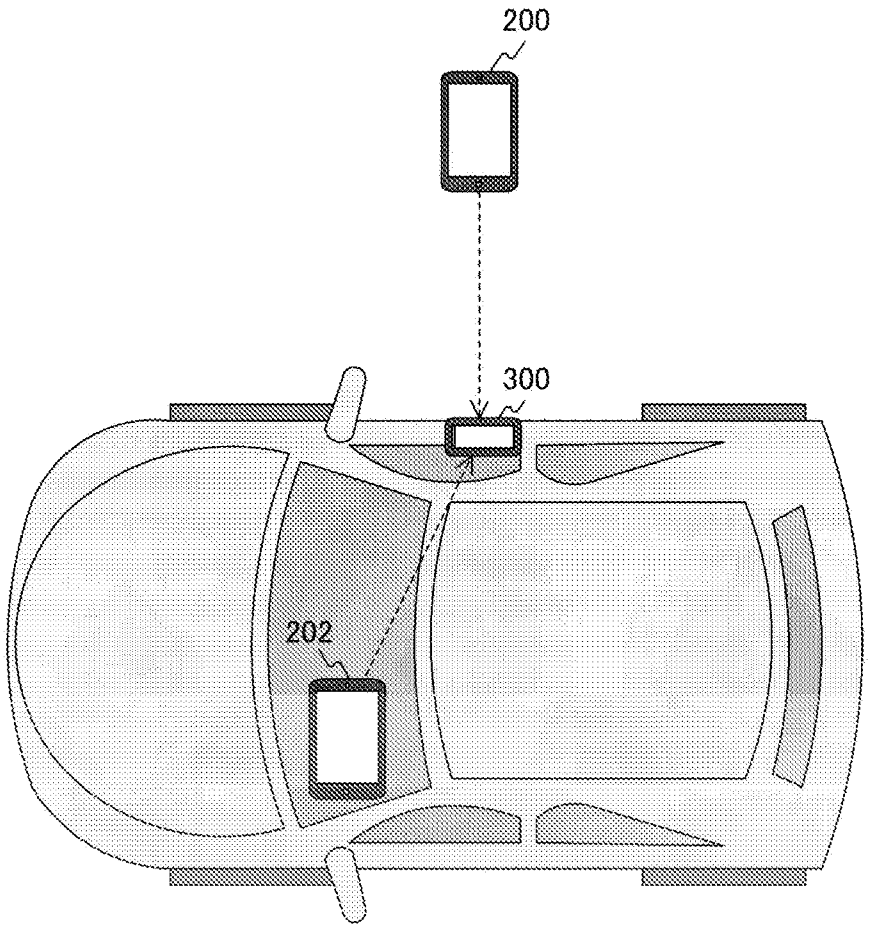
FIG. 5 is a view depicting a first example of a mode of inside/outside determination according to the first embodiment of the present technology.

FIG. 5 is a view depicting a first example of a mode of the inside/outside determination according to the first embodiment of the present technology.

Each of portable terminals 200 and 202 and a locking/unlocking unit 300 is an example of the communication apparatus described above. Here, it is supposed that the locking/unlocking unit 300 that performs opening and closing of a door of an automobile with a key is installed on the outer side of a door handle. The locking/unlocking unit 300 has a function for performing wireless communication with the portable terminals 200 and 202 to measure a phase characteristic of a frequency. It is assumed that each of the portable terminals 200 and 202 holds in advance a key for performing locking and unlocking of the automobile.

When a user having the portable terminal 200 approaches from the outside of the automobile, the locking/unlocking unit 300 performs wireless communication with the portable terminal 200, generates distance information from a phase characteristic of the wireless communication, and unlocks the door with the key if the distance information is within a certain distance.

On the other hand, in a case where the user having the portable terminal 200 is present farther than the certain distance, when a user having the portable terminal 202 is in the passenger seat, if the determination is made only from the distance, then it is possible to perform unlocking. Therefore, in order to allow locking and unlocking only in a case where the portable terminal 200 or 202 is present outside the automobile, it is determined on which one of the inside and the outside of the vehicle the portable terminal 200 or 202 is present. This makes it impossible to perform locking and unlocking by using the key of the portable terminal 202 that is present on the inside of the vehicle while it is made possible to perform locking and unlocking by using the key of the portable terminal 200 that is present on the outside of the vehicle.

Figure 6:
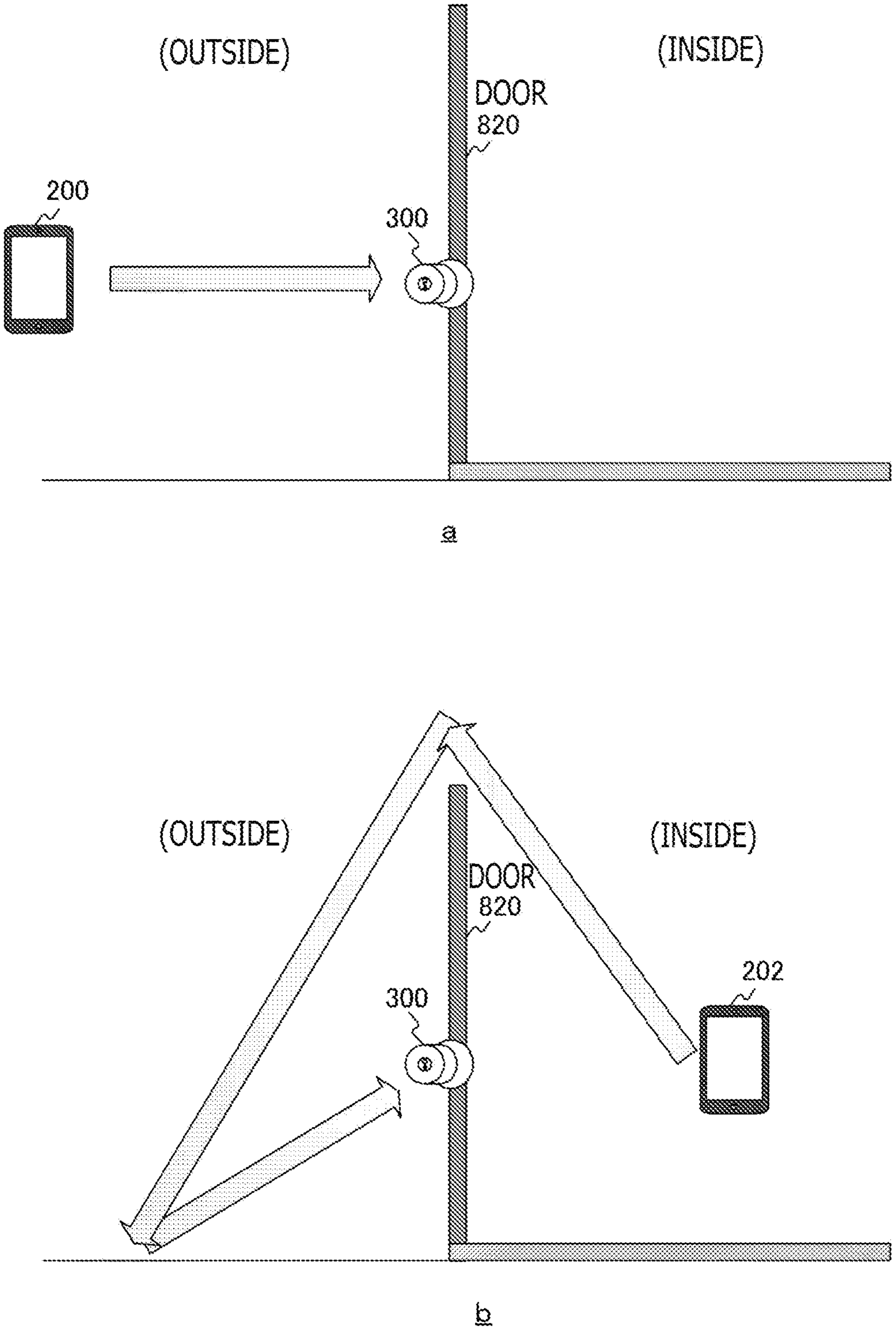
FIG. 6 is a view depicting a second example of the mode of the inside/outside determination according to the first embodiment of the present technology.

FIG. 6 is a view depicting a second example of the mode of the inside/outside determination according to the first embodiment of the present technology.

Although it is supposed that, in the first example of the mode described above, opening and closing of an automobile with a key are performed, in the second example of the mode, it is supposed that opening and closing of a door of a house is performed. Also in this example, it is assumed that the locking/unlocking unit 300 is installed on the outer side of a door knob.

As depicted in "a" of FIG. 6, when the user having the portable terminal 200 approaches from the outside, the locking/unlocking unit 300 performs wireless communication with the portable terminal 200, generates distance information from the phase characteristic of the wireless communication, and unlocks a door 820 with a key if the distance information is within a certain distance.

On the other hand, as depicted in "b" of FIG. 6, even if the portable terminal 202 is present in the house, the door 820 is not unlocked with a key of the portable terminal 202. This is because, if the door 820 is unlocked, then this results in permission of invasion from the outside.

Such inside/outside determination can be made in the following manner on the basis of a phase characteristic measured by the phase measurement block 110 of the communication apparatus.

[Phase Characteristic]

Figure 7:
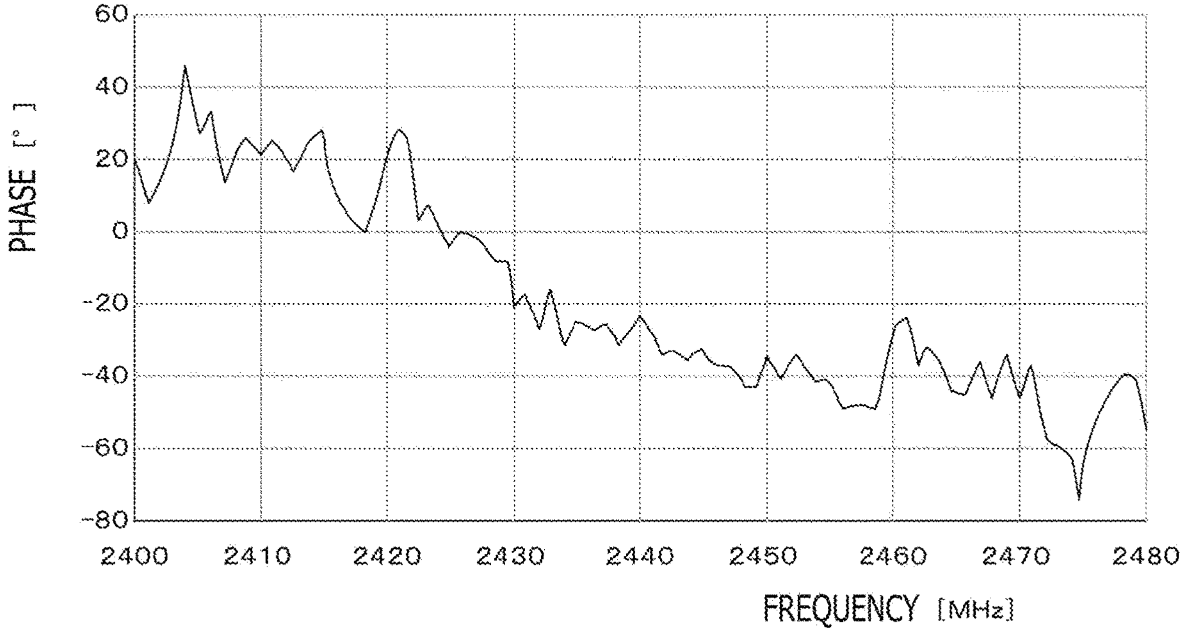
FIG. 7 is a diagram depicting examples of phase characteristics measured by a phase measurement block 110 according to the first embodiment of the present technology.
Figure 7:
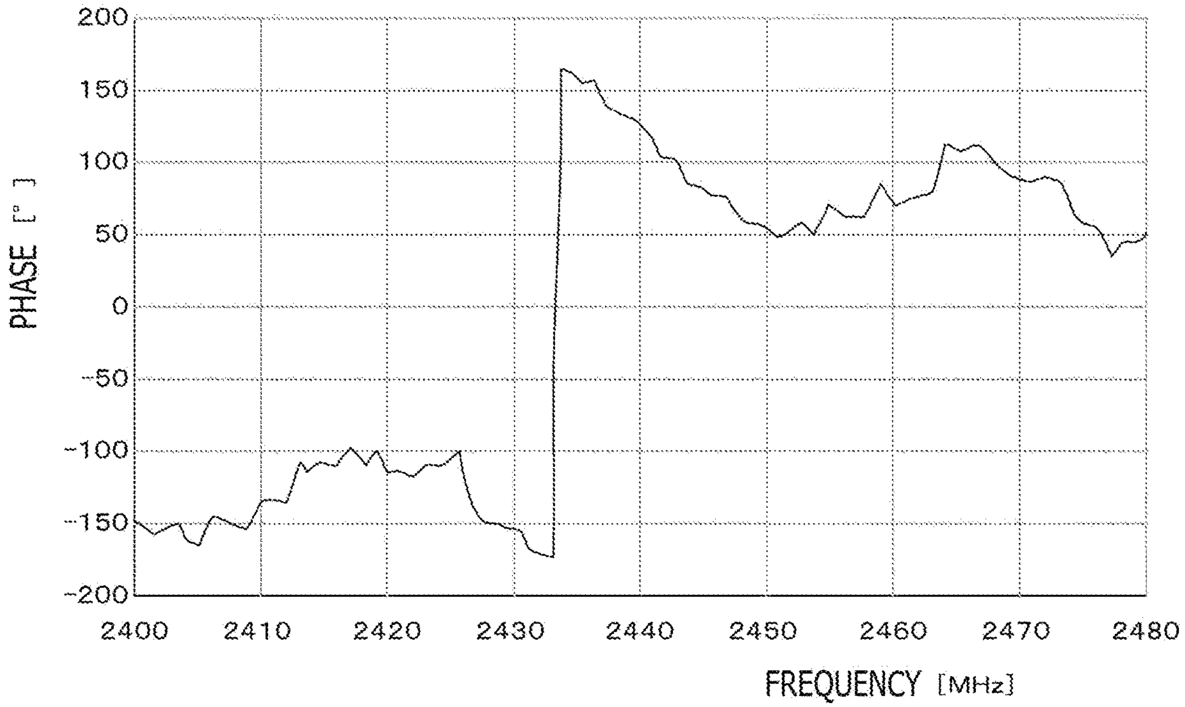

FIG. 7 is a diagram depicting examples of phase characteristics measured by the phase measurement block 110 according to the first embodiment of the present technology.

In the phase characteristics depicted here, the axis of abscissa indicates a frequency (MHz), and the axis of ordinate indicates a phase value (°). "a" of FIG. 7 depicts a waveform obtained in a case where the portable terminal 200 is present on the outside of the door in a case where the locking/unlocking unit 300 is provided on the outer side of the door. "b" of FIG. 7 depicts a waveform obtained in a case where the portable terminal 200 is present on the inside of the door in a case where the locking/unlocking unit 300 is provided on the outer side of the door.

If the waveforms are compared with each other, then it can be recognized that, even if the distances on the outside and the inside with respect to the door are equal to each other, the characteristics are largely different from each other. In the former case, since no obstacle is present, the phase characteristic indicates comparatively moderate displacement. On the other hand, in the latter case, since the door is present as an obstacle, a great change is seen in the phase characteristic.

Accordingly, it is possible to perform inside/outside determination from the phase waveforms. For example, it is conceivable to make inside/outside determination by acquiring big data in both a case in which the communication apparatuses are present on the opposite sides with an obstacle interposed therebetween and another case in which the visibility is ensured without interposition of an obstacle and then using the big data for contrast.

Further, as another technique for the inside/outside determination, some feature amount may be extracted from a phase characteristic such that inside/outside determination is performed on the basis of the feature amount. For example, a time response characteristic may be determined from a phase characteristic such that inside/outside determination is performed on the basis of the time response characteristic as described below.

Figure 8:
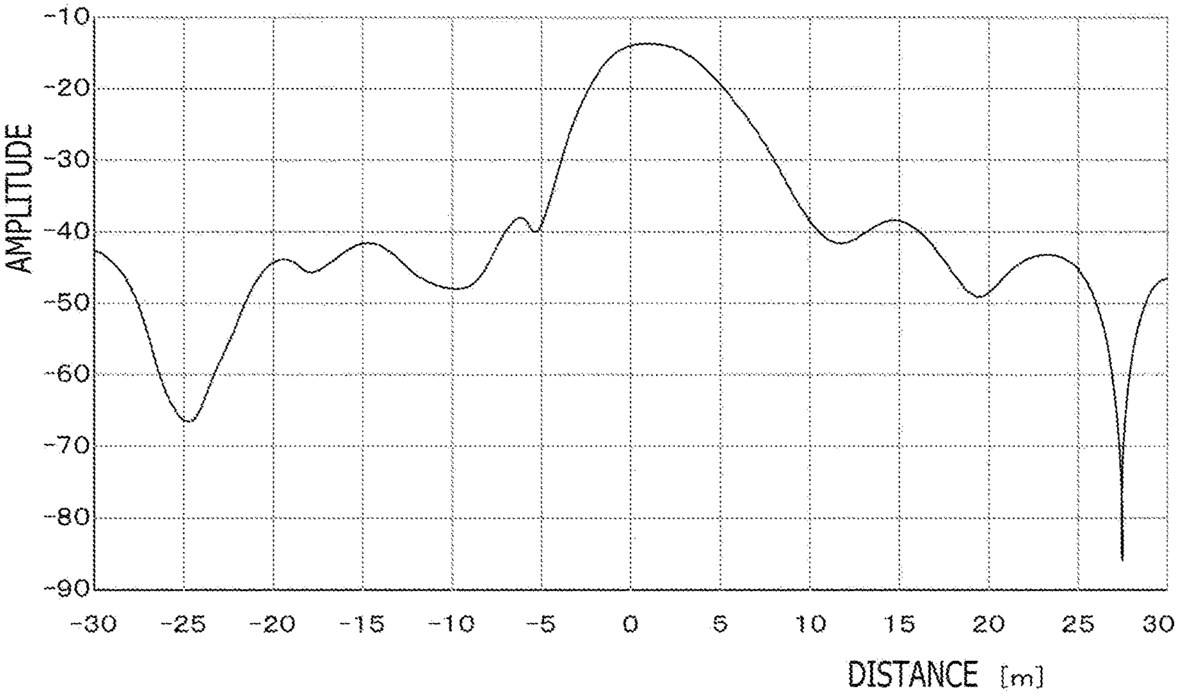
FIG. 8 is a diagram depicting examples of time response characteristics utilized in an inside/outside determination section 192 according to the first embodiment of the present technology.
Figure 8:
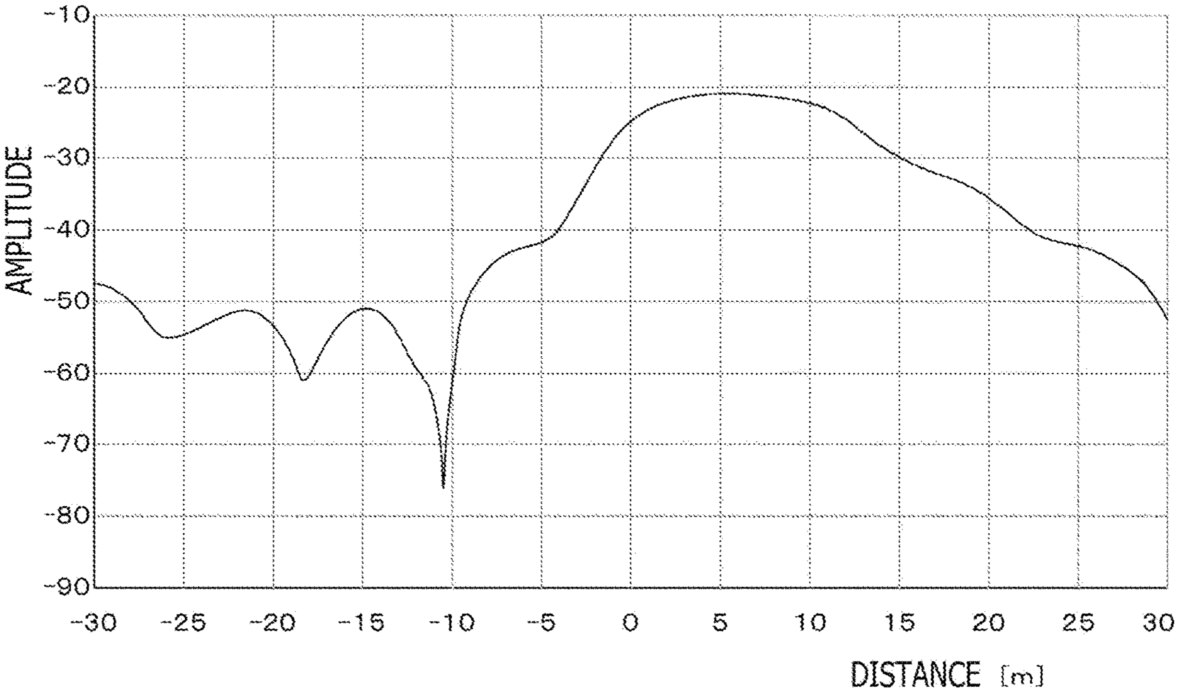

FIG. 8 is a diagram depicting examples of time response characteristics utilized in the inside/outside determination section 192 according to the first embodiment of the present technology.

In the time response characteristic indicated here, the axis of abscissa is a distance (m) and the axis of ordinate is an amplitude. The distance in this case is obtained by multiplying the time by the velocity of light. "a" of FIG. 8 depicts a waveform obtained in a case where the portable terminal 200 is present on the outside of the door in a case where the locking/unlocking unit 300 is provided on the outer side of the door. "b" of FIG. 8 depicts a waveform obtained in a case where the portable terminal 200 is present on the inside of the door in a case where the locking/unlocking unit 300 is provided on the outer side of the door.

The time response characteristic is obtained by performing inverse fast Fourier transform (IFFT) for the phase characteristic measured by the phase measurement block 110. In this inverse fast Fourier transform, a process of performing, for example, zero padding for a value in the frequency domain such that the value becomes a value of power of 2 and then multiplying the resulting value by a window function to convert the value into a value in the time domain is performed.

If the waveforms of the time response characteristics are compared with each other, then in “a” of FIG. 8, the ratio of the preceding wave (direct wave) is high, and the amplitude value within the range of 0 to 5 m is highest. Meanwhile, in “b” of FIG. 8, although a certain degree of amplitude is exhibited also within the range of 0 to 5 m, since the ratio of the delayed wave (reflected wave or refracted wave) increases, the amplitude within the range of 5 to 10 m increases, and the waveform indicates a tendency that the peak is gentle on the whole.

Accordingly, the inside/outside determination can be performed by analyzing the waveforms of the time response characteristic obtained in the manner described above. As a more particular example, an example in which amplitude ratios between preceding and succeeding amplitude components with respect to the calculated distance value and later equal width components are used is described below.

FIG. 9 is a view depicting an example of an average amplitude value of the time response characteristic utilized in the inside/outside determination section 192 according to the first embodiment of the present technology.

Here, it is assumed that, when the calculated distance value is 1 m, “components within the range of −1 to 3 m” that are components in preceding and succeeding ranges of 2 m with respect to the calculated distance value are preceding wave components, and it is assumed that “components within the range of 3 to 8 m” are delayed wave components. Further, it is assumed that “components within the range of 8 to 13 m” are second delayed wave components.

In addition, “OUTSIDE DOOR” indicates data obtained in a case where the portable terminal 200 is present on the outside of the door in a case where the locking/unlocking unit 300 is provided on the outer side of the door. “INSIDE DOOR” indicates data obtained in a case where the portable terminal 200 is present on the inside of the door in a case where the locking/unlocking unit 300 is provided on the outer side of the door.

In each field, a value on the upper side is an average amplitude. Meanwhile, a value in parentheses on the lower side indicates a ratio in level obtained in a case where preceding wave components are made a reference (1.00). From this, it can be recognized that, in a case where the key is present outside the door, the average amplitude decreases monotonously but, in a case where the key is present inside the door, the average amplitude indicates a flat change. By calculating the ratio between the preceding wave components and the delayed wave components in the manner described above, inside/outside determination can be performed.

[Operation]

Figure 10:
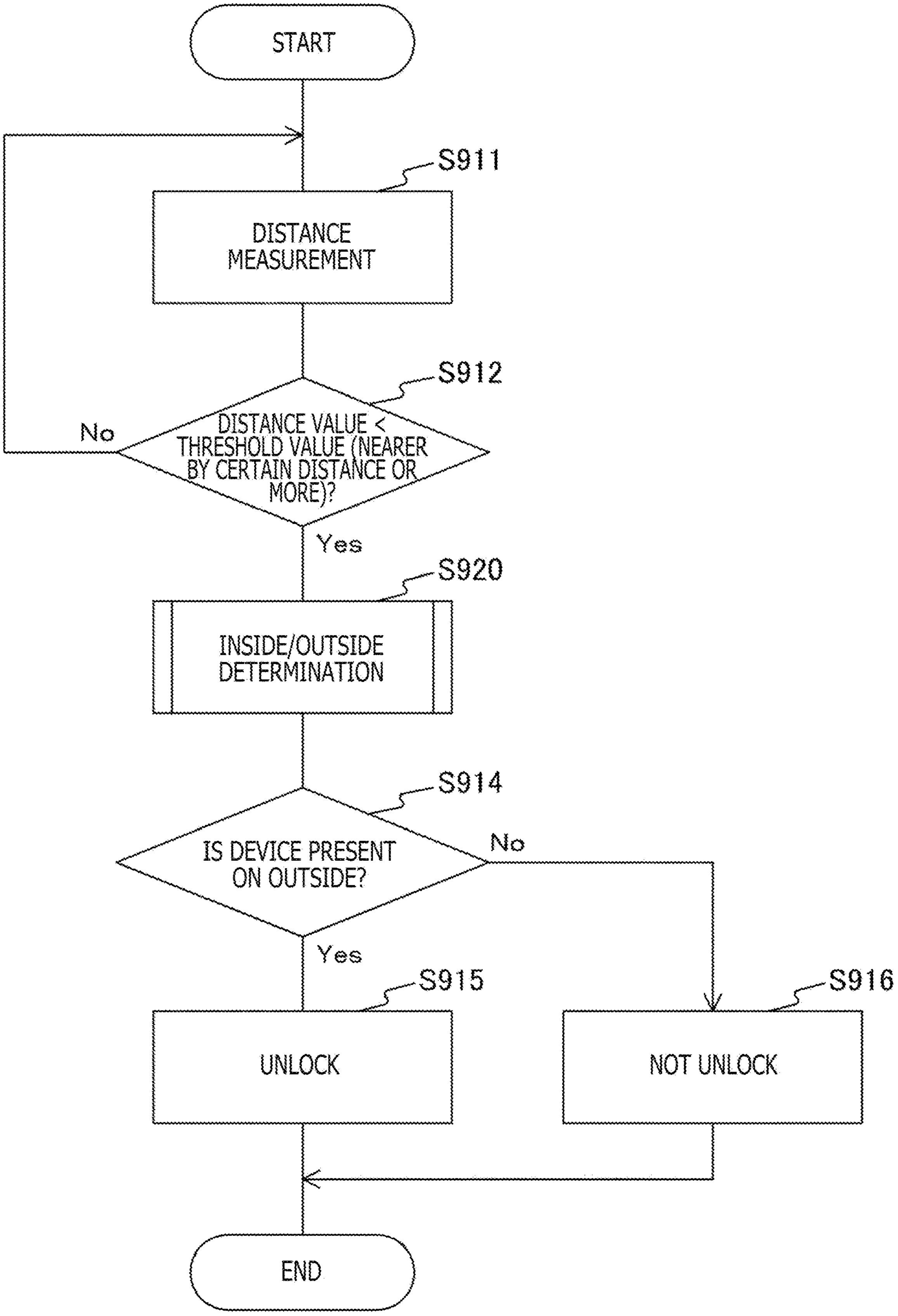
FIG. 10 is a flow chart depicting an example of a processing procedure of the communication apparatus according to the first embodiment of the present technology.

FIG. 10 is a flow chart depicting an example of a processing procedure of the communication apparatus according to the first embodiment of the present technology. Here, supposed is a scene in which, when the portable terminal 200 approaches, the locking/unlocking unit 300 installed on the outer side determines whether or not unlocking is to be performed.

First, the locking/unlocking unit 300 performs wireless communication with the portable terminal 200, and the phase measurement block 110 performs phase measurement. Then, the distance generation section 191 generates a distance between the communication apparatuses on the basis of the phase characteristic (step S911). At this time, if the value of the distance obtained is lower than a predetermined threshold value (step S912: Yes), that is, if the distance is a short distance to some degree, then the processing advances to next inside/outside determination (step S920). On the other hand, if the value of the distance obtained is not lower than the predetermined threshold value (step S912: No), then the distance measurement (step S911) is repeated.

If the result of the inside/outside determination (step S920) performed by the inside/outside determination section 192 indicates that the communication apparatus of the other party (for example, the portable terminal 200) is present on the outside (step S914: Yes), then the key controlling section 193 performs unlocking with the key (step S915). On the other hand, if the communication apparatus of the other party is present on the inside (step S914: No), then the key controlling section 193 determines that unlocking with the key is not to be performed (step S916).

Figure 11:
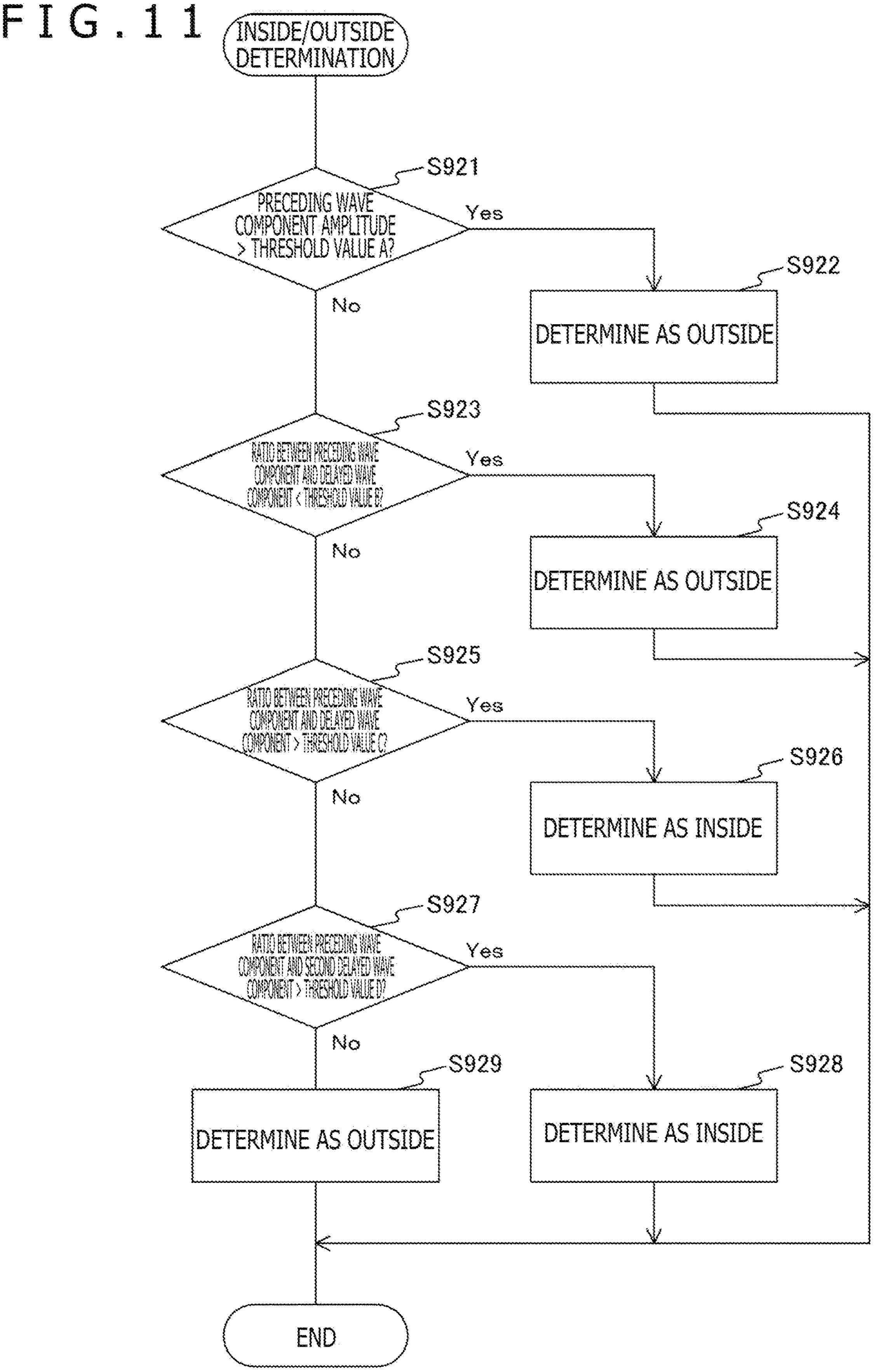
FIG. 11 is a flow chart depicting an example of a processing procedure for inside/outside determination (step S920) of the communication apparatus according to the first embodiment of the present technology.

FIG. 11 is a flow chart depicting an example of a processing procedure of the inside/outside determination (step S920) of the communication apparatus according to the first embodiment of the present technology.

If the amplitude of the preceding wave components is higher than a predetermined threshold value A (step S921: Yes), then the inside/outside determination section 192 determines that the portable terminal 200 is present on the outside (step S922). In particular, if the amplitude of the preceding wave components is great to some degree, then it is unnecessary to compare the amplitude of the preceding wave components with that of the delayed wave components and it is determined that the portable terminal 200 is present on the outside.

Further, if the ratio between the preceding wave components and the delayed wave components is lower than a predetermined threshold value B (step S923: Yes), then the inside/outside determination section 192 determines that the portable terminal 200 is present on the outside (step S924). In other words, in a case where it is determined that the number of preceding wave components is greater to some degree than the number of delayed wave components, the inside/outside determination section 192 determines that the portable terminal 200 is present on the outside.

In addition, if the ratio between the preceding wave components and the delayed wave components is higher than a predetermined threshold value C (step S925: Yes), then the inside/outside determination section 192 determines that the portable terminal 200 is present on the inside (step S926). In particular, if it is determined that the number of delayed wave components is greater to some degree than the number of preceding wave components, then the inside/outside determination section 192 determines that the portable terminal 200 is present on the inside.

Moreover, if the ratio between the preceding wave components and the second delayed wave components is higher than a predetermined threshold value D (step S927: Yes), then the inside/outside determination section 192 determines that the portable terminal 200 is present on the inside (step S928). On the other hand, if the ratio between the preceding wave components and the second delayed wave components is not higher than a predetermined threshold value D (step S927: No), then the inside/outside determination section 192 determines that the portable terminal 200 is present on the outside (step S929).

It is to be noted that this is merely one example, and the delayed wave components and the second delayed wave components may be added to perform determination, or in a case where none of the threshold values is reached, measurement may be performed again.

In the manner described above, according to the first embodiment of the present technology, by the inside/outside determination performed on the basis of the phase characteristic by the inside/outside determination section 192, it is possible to grasp a positional relation with an obstacle between the communication apparatuses taken into consideration to appropriately perform opening/closing control with a key.

2. Second Embodiment

Although, in the first embodiment described above, the single antenna 160 is used to measure a phase characteristic, in the present second embodiment, two antennae 160 are used to perform inside/outside determination of a higher degree of accuracy. It is to be noted that, since the configuration as the communication apparatus is basically similar to that in the first embodiment described hereinabove, detailed description thereof is omitted, and also in the following description of the block configuration, some of components are omitted as appropriate.

[Communication Apparatus]

Figure 12:
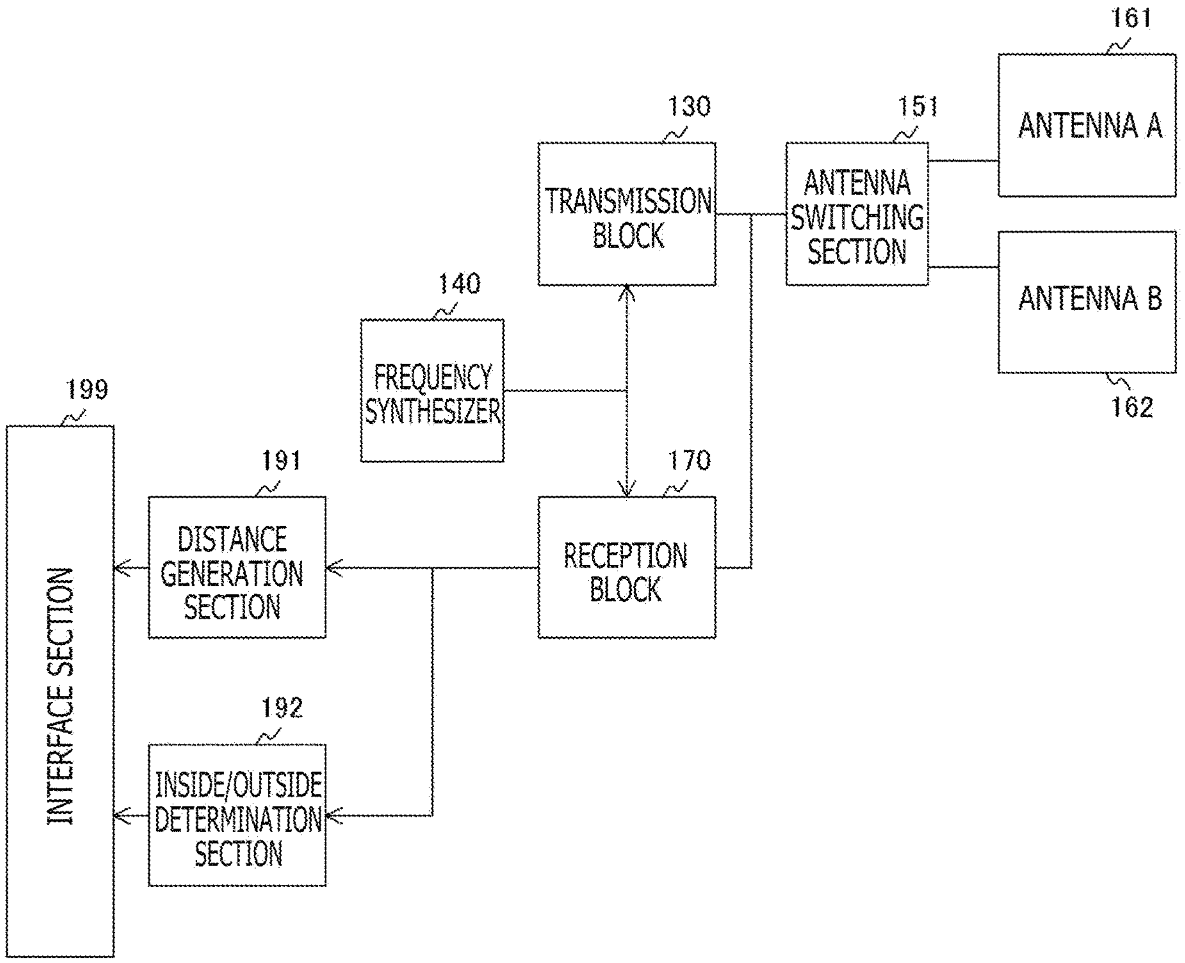
FIG. 12 is a diagram depicting a first example of a block configuration of a communication apparatus according to a second embodiment of the present technology.

FIG. 12 is a diagram depicting a first example of a block configuration of a communication apparatus according to the second embodiment of the present technology.

The first example of the configuration of the communication apparatus according to the present second embodiment includes two antennae of an antenna A 161 and an antenna B 162, and further includes an antenna switching section 151 for switching them. The antenna switching section 151 can be implemented, for example, by the RF switch 150 described hereinabove.

By using the antenna switching section 151 to switch the two antenna A 161 and antenna B 162 time-divisionally, results of wireless communication through the two antenna A 161 and antenna B 162 can be acquired separately from each other, and the inside/outside determination can be performed on the basis of the results.

Figure 13:
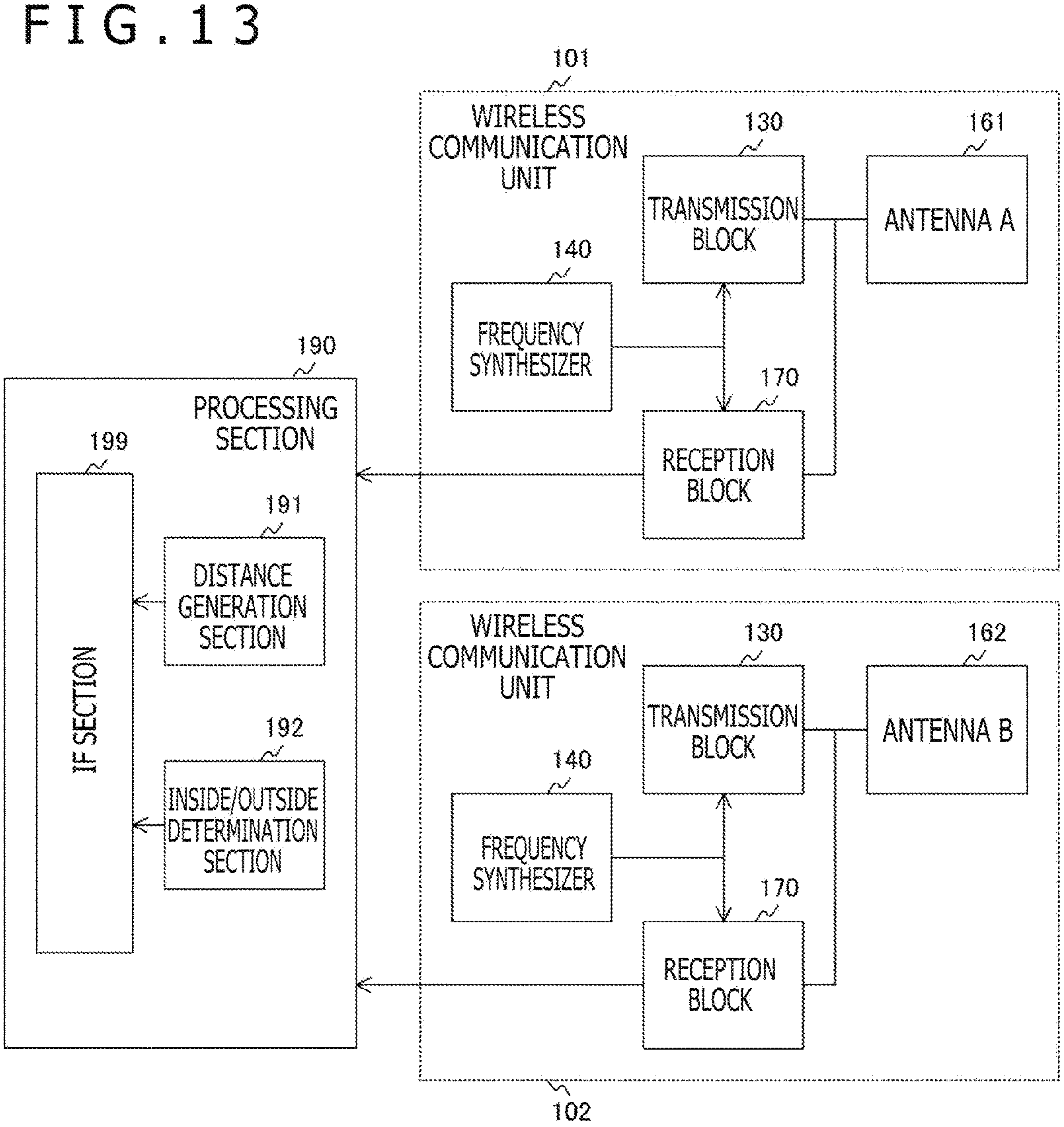
FIG. 13 is a diagram depicting a second example of the block configuration of the communication apparatus according to the second embodiment of the present technology.

FIG. 13 is a diagram depicting a second example of the block configuration of the communication apparatus according to the second embodiment of the present technology.

The second example of the configuration of the communication apparatus according to the present second embodiment includes two wireless communication units 101 and 102 corresponding to the two antenna A 161 and antenna B 162, respectively. The wireless communication units 101 and 102 individually include a transmission block 130, a reception block 170, an antenna 160, a frequency synthesizer 140, and so forth.

Since the two wireless communication units 101 and 102 are provided, results of wireless communication through the two antenna A 161 and antenna B 162 can be acquired separately from each other, and the inside/outside determination can be performed on the basis of the results.

[Operation]

Figure 14:
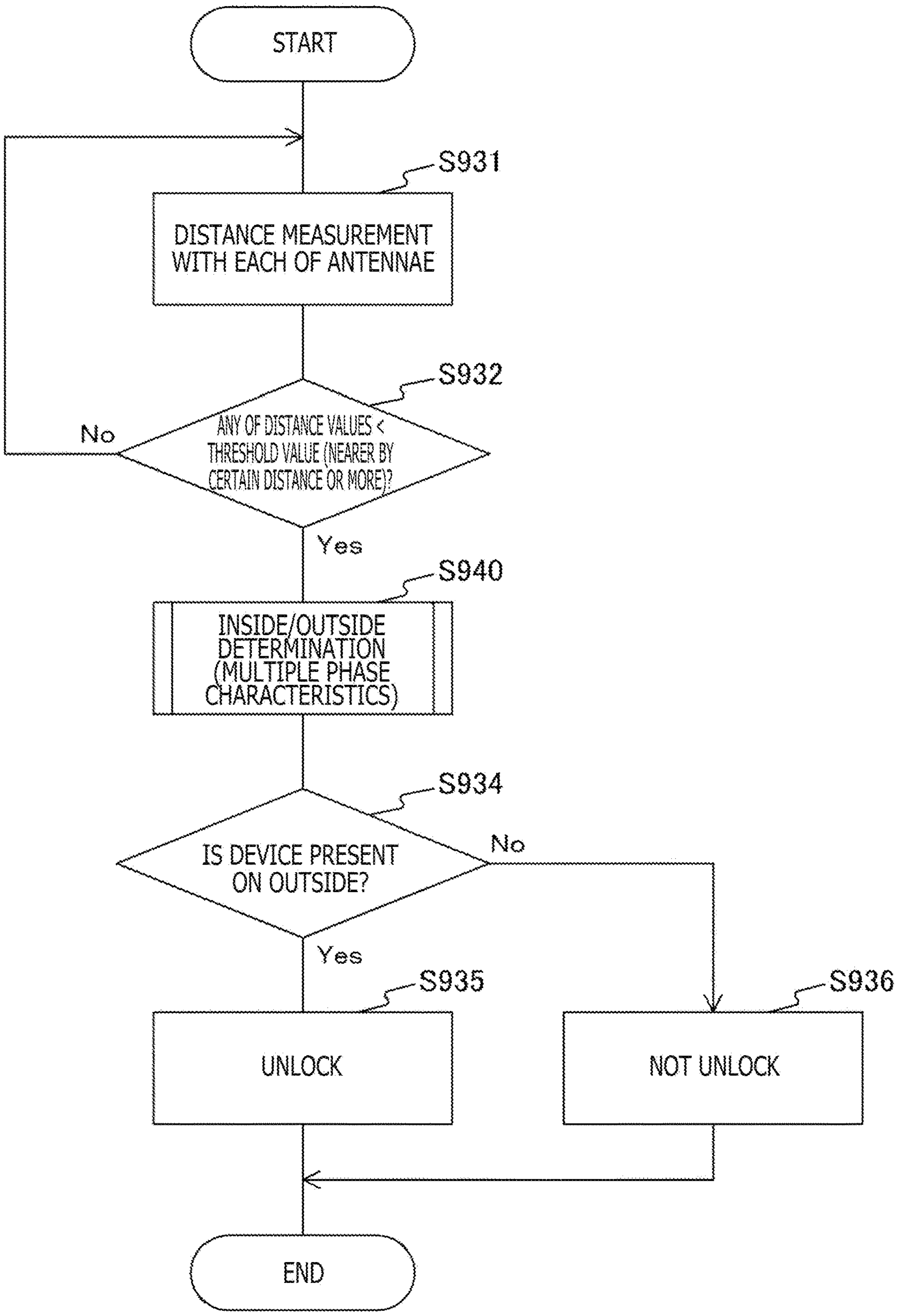
FIG. 14 is a flow chart depicting an example of a processing procedure of the communication apparatus according to the second embodiment of the present technology.

FIG. 14 is a flow chart depicting an example of a processing procedure of the communication apparatus according to the second embodiment of the present technology. Here, supposed is a scene in which, when the portable terminal 200 approaches, the locking/unlocking unit 300 installed on the outer side determines whether or not unlocking is to be performed.

First, the locking/unlocking unit 300 performs wireless communication with the portable terminal 200 through the two antenna A 161 and antenna B 162, and the phase measurement block 110 performs phase measurement. Then, the distance generation section 191 generates distances between the communication apparatuses on the basis of the phase characteristics (step S931). At this time, if the value of the distance obtained at least from any one of the phase characteristics is lower than a predetermined threshold value (step S932: Yes), then the processing advances to next inside/outside determination (step S940). On the other hand, if any of the values of the distances obtained is not lower than the predetermined threshold value (step S932: No), then the distance measurement (step S931) is repeated.

If results of the inside/outside determination (step S940) performed by the inside/outside determination section 192 on the basis of the separate phase characteristics obtained through the two antenna A 161 and antenna B 162 indicate that the communication apparatus of the other party (for example, the portable terminal 200) is present on the outside (step S934: Yes), then the key controlling section 193 performs unlocking with the key (step S935). On the other hand, if the communication apparatus of the other party is present on the outside (step S934: No), then the key controlling section 193 determines that unlocking with the key is not to be performed (step S936).

Figure 15:
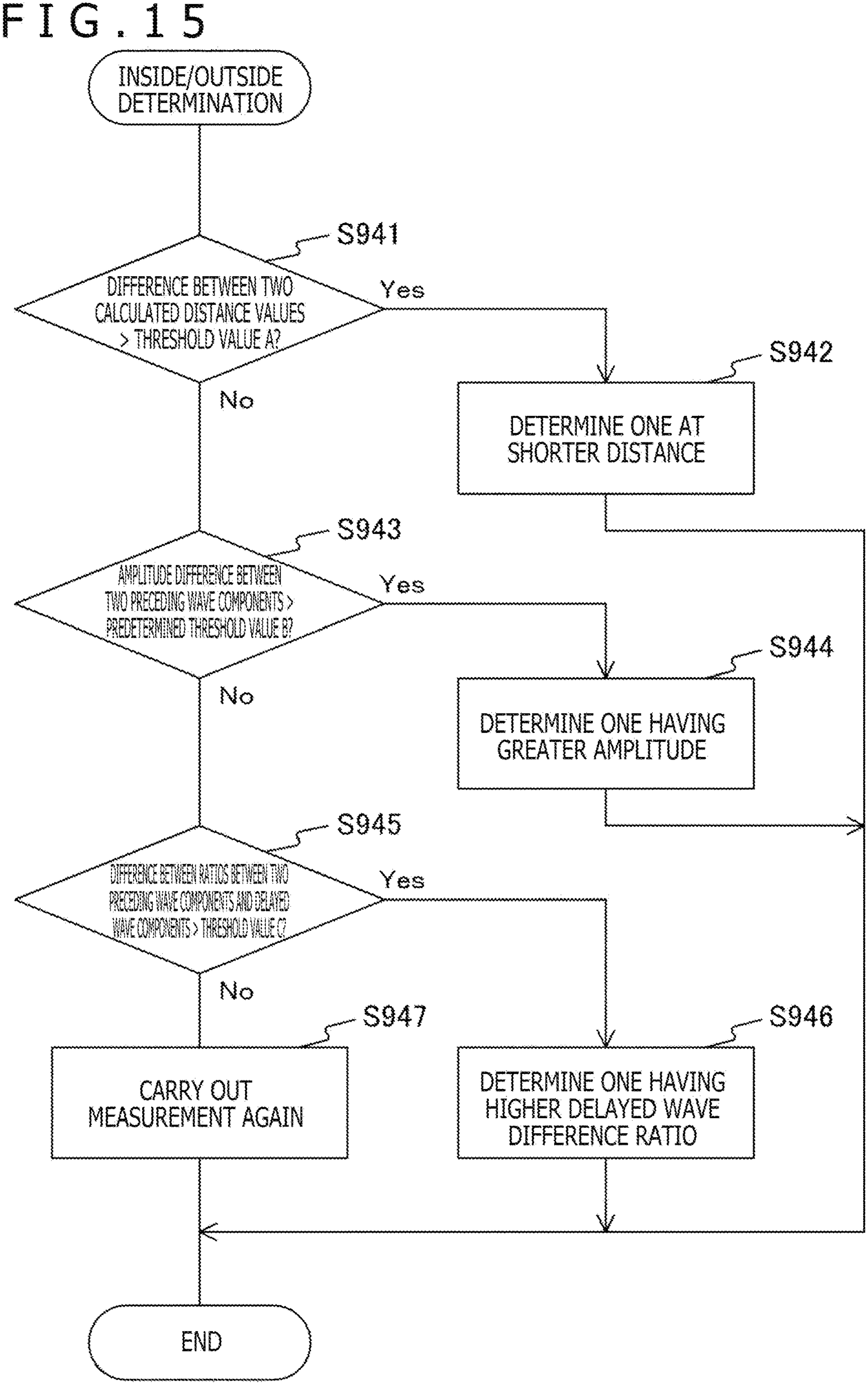
FIG. 15 is a flow chart depicting an example of a processing procedure of inside/outside determination (step S940) of the communication apparatus according to the second embodiment of the present technology.

FIG. 15 is a flow chart depicting an example of a processing procedure of the inside/outside determination (step S940) of the communication apparatus according to the second embodiment of the present technology.

Here, it is supposed that, of the two antenna A 161 and antenna B 162, the antenna A 161 is located on the outer side of the door and the antenna B 162 is located on the inner side of the door.

First, if the difference between values of the distances calculated on the basis of the phase characteristics obtained through the two antenna A 161 and antenna B 162 is greater than a predetermined threshold value A (step S941: Yes), then it is determined that the portable terminal 200 is present at the smaller one of the distances (step S942). For example, in a case where the distances have a difference therebetween, such as a case where the distance of the antenna A 161 is 1 m and the distance of the antenna B 162 is 10 m, it is determined that the portable terminal 200 is present on the outside of the door.

Further, if the difference in amplitude between the preceding wave components (in the proximity of the calculation distance value) of the two antenna A 161 and antenna B 162 is greater than a predetermined threshold value B (step S943: Yes), then it is determined that the portable terminal 200 is present at the location corresponding to the greater amplitude (step S944). For example, if the amplitude at the antenna A 161 is −10 dB and the amplitude at the antenna B 162 is −60 dB, then, even if calculated distances are similar to each other, it is determined that the portable terminal 200 is present on the outside of the door.

In addition, if the difference between ratios of the preceding wave components and the delayed wave components of the two antenna A 161 and antenna B 162 is greater than a predetermined threshold value C (step S945: Yes), then it is determined that the portable terminal 200 is present at the location at which the difference ratio of the delayed wave components is higher (step S946). For example, as in the example described above, in a case where the delayed wave component ratio on the outside of the door is 0.59 (decreased by 41%) and the delayed wave component ratio on the inside of the door is 1.11 (increased by 11%), it is determined that the portable terminal 200 is present on the outside of the door.

Moreover, in a case where the conditions described above are not satisfied and the phase characteristics obtained through the two antenna A 161 and antenna B 162 indicate similar results, measurement is performed again (step S947).

In the manner described above, according to the second embodiment of the present technology, by performing inside/outside determination of a higher degree of accuracy on the basis of phase characteristics obtained through the two antenna A 161 and antenna B 162, opening/closing control with the key can be performed appropriately. Further, this makes it possible to improve the security performance of the virtual key system.

It is to be noted that each of the embodiments described above demonstrates an example for embodying the present technology, and matters in the embodiments and the matters to define the invention in the claims individually have a corresponding relation. Similarly, the matters to define the invention in the claims and matters in the embodiments of the present technology denoted by the same names individually have a corresponding relation to each other. However, the present technology is not restricted to the embodiments and can be embodied by performing various modifications for the embodiments without departing from the spirit and scope of the present technology.

Further, the processing procedures described in the foregoing description of the embodiments may be grasped as a method having the series of procedures or may be grasped as a program for causing a computer to execute the series of processes or as a recording medium in which the program is stored. As this recording medium, for example, a CD (Compact Disc), an MD (Mini Disc), a DVD (Digital Versatile Disc), a memory card, a Blu-ray (registered trademark) disc, and so forth can be used.

It is to be noted that the advantageous effects described in the present specification are merely exemplary and are not restrictive, and other advantageous effects may be available.

It is to be noted that the present technology can also assume such configurations as described below.

(1)

A communication apparatus including:

a distance generation section that generates distance information on the basis of a phase characteristic of a frequency of a propagation channel to and from another communication apparatus; and an inside/outside determination section that performs inside/outside determination on whether or not an obstacle is interposed between the communication apparatus and the difference communication apparatus, on the basis of the phase characteristic.

(2)

The communication apparatus according to (1) above, in which the inside/outside determination section extracts a predetermined feature amount from the phase characteristic and performs the inside/outside determination on the basis of the feature amount.

(3)

The communication apparatus according to (1) or (2) above, in which the inside/outside determination section generates a time response characteristic from the phase characteristic and performs the inside/outside determination on the basis of the time response characteristic.

(4)

The communication apparatus according to (3) above, in which the inside/outside determination section performs the inside/outside determination on the basis of a relation between a preceding wave and a delayed wave in the time response characteristic.

(5)

The communication apparatus according to (3) or (4) above, in which the inside/outside determination section performs the inside/outside determination on the basis of a component ratio between a preceding wave and a delayed wave in the time response characteristic.

(6)

The communication apparatus according to any one of (1) to (5) above, in which the distance generation section generates the distance information on the basis of group delay information generated from the phase characteristic.

(7)

The communication apparatus according to any one of (1) to (6) above, further including: a phase measurement section that measures the phase characteristic by transmission and reception to and from the other communication apparatus.

(8)

The communication apparatus according to (7) above, further including:

multiple antennae used for transmission and reception to and from the other communication apparatus, in which the phase measurement section measures the phase characteristic through each of the multiple antennae to generate multiple phase characteristics, the distance generation section generates the distance information on the basis of each of the multiple phase characteristics, and the inside/outside determination section performs the inside/outside determination on the basis of each of the multiple phase characteristics.

(9)

The communication apparatus according to (8) above, further including:

an antenna switching section that sequentially switches the multiple antennae.

(10)

The communication apparatus according to any one of (1) to (9) above, further including:

a key controlling section that controls at least one of locking and unlocking with a key on the basis of the distance information and a result of the inside/outside determination.

(11)

A communication system including:

first and second communication apparatuses that transmit and receive a measurement signal to and from each other, in which the first communication apparatus includes a distance generation section that generates distance information on the basis of a phase characteristic of a frequency of a propagation channel when the first communication apparatus transmits and receives the measurement signal to and from the second communication apparatus, and an inside/outside determination section that performs inside/outside determination on whether or not an obstacle is interposed between the first communication apparatus and the second communication apparatus, on the basis of the phase characteristic.

(12)

A key opening/closing controlling method for a communication apparatus, the method including:

a procedure, by a distance generation section, of generating distance information on the basis of a phase characteristic of a frequency of a propagation channel to and from another communication apparatus;

a procedure by, an inside/outside determination section, of performing inside/outside determination on whether or not an obstacle is interposed between the communication apparatus and the other communication apparatus, on the basis of the phase characteristic; and a procedure, by a key controlling section, of controlling at least one of locking and unlocking with a key on the basis of the distance information and a result of the inside/outside determination.

REFERENCE SIGNS LIST

10: Initiator
20: Reflector
30: Propagation channel
110: Phase measurement block
111: Modulator
115: Phase measurement section
120: DAC (Digital-to-Analog Converter)
130: Transmission block
131: BPF (Band-Pass Filter)
132: Mixer
140: Frequency synthesizer
150: RF switch
151: Antenna switching section
160, 161, 162: Antenna
170: Reception block
171: LNA (Low Noise Amplifier)
172: Mixer
173: BPF
174: VGA (Variable Gain Amplifier)
180: ADC (Analog-to-Digital Converter)
190: Locking/unlocking block
191: Distance generation section
192: Inside/outside determination section
193: Key controlling section
199: Interface section
200, 202: Portable terminal
300: Locking/unlocking unit

The invention claimed is:

1. A communication apparatus comprising:

a phase measuring device configured to measure a phase characteristic of a frequency of a propagation channel to and from another communication apparatus;

a time response characteristic generator configured to generate a time response characteristic from the phase characteristic, the time response characteristic including a waveform component; and a determination section that performs a determination on whether or not an obstacle is interposed between the communication apparatus and the another communication apparatus on a basis of the waveform component of the time response characteristic, wherein the waveform component is one of a plurality of waveform components including a preceding wave component and a delayed wave component, and the determination section performs the determination on a basis of a component ratio between the preceding wave component and the delayed wave component in the time response characteristic.

2. The communication apparatus according to claim 1, wherein the determination section extracts a predetermined feature amount from the phase characteristic and performs the determination on a basis of the feature amount.

3. The communication apparatus according to claim 1, further comprising:

a distance generation section configured to generate distance information on a basis of group delay information generated from the phase characteristic.

4. The communication apparatus according to claim 1, further comprising:

a phase measurement section that measures the phase characteristic by transmission and reception to and from the another communication apparatus.

5. The communication apparatus according to claim 4, further comprising:

multiple antennae used for transmission and reception to and from the another communication apparatus; and a distance generation section generates distance information on a basis of each of multiple phase characteristics, wherein the phase measurement section measures the phase characteristic through each of the multiple antennae to generate multiple phase characteristics, and the determination section performs the determination on the basis of each of the multiple phase characteristics.

6. The communication apparatus according to claim 5, further comprising:

an antenna switching section that sequentially switches the multiple antennae.

7. The communication apparatus according to claim 1, further comprising:

a key controlling section that controls at least one of locking and unlocking with a key on a basis of distance information and a result of the determination.

8. The communication apparatus according to claim 1, wherein the determination section determines that an obstacle is interposed when a component ratio between the preceding wave component and the delayed wave component satisfies a predetermined threshold condition.

9. The communication apparatus according to claim 1, wherein the delayed wave component is one of a plurality of delayed wave components, and the determination section performs the determination based on a ratio between the preceding wave component and at least two delayed wave components.

10. The communication apparatus according to claim 1, wherein the preceding wave component and the delayed wave component are extracted from predefined distance windows centered on a calculated distance.

11. A non-transitory computer readable medium storing a program for operating a communication apparatus, the program being executable by at least one processor to perform operations comprising:

measuring a phase characteristic of a frequency of a propagation channel to and from another communication apparatus;

generating a time response characteristic from the phase characteristic, the time response characteristic including a waveform component; and performing a determination on whether or not an obstacle is interposed between the communication apparatus and the another communication apparatus on a basis of the waveform component of the time response characteristic, wherein the waveform component is one of a plurality of waveform components including a preceding wave component and a delayed wave component, and the determination is performed on a basis of a component ratio between the preceding wave component and the delayed wave component in the time response characteristic.

12. The non-transitory computer readable medium according to claim 11, wherein the operations further comprise:

extracting a predetermined feature amount from the phase characteristic and performing the determination on a basis of the feature amount.

13. The non-transitory computer readable medium according to claim 11, wherein the operations further comprise:

generating distance information on a basis of group delay information generated from the phase characteristic.

14. The non-transitory computer readable medium according to claim 11, wherein the operations further comprise:

measuring the phase characteristic by transmission and reception to and from the another communication apparatus.

15. The non-transitory computer readable medium according to claim 14, further comprising:

multiple antennae used for transmission and reception to and from the another communication apparatus; and wherein the operations further comprise:

generating distance information on a basis of each of multiple phase characteristics, wherein measuring the phase characteristic through each of the multiple antennae to generate multiple phase characteristics; and performing the determination on the basis of each of the multiple phase characteristics.

16. The non-transitory computer readable medium according to claim 15, wherein the operations further comprise:

sequentially switching the multiple antennae.

17. The non-transitory computer readable medium according to claim 11, wherein the operations further comprise:

controlling at least one of locking and unlocking with a key on a basis of distance information and a result of the determination.

18. The non-transitory computer readable medium according to claim 11, wherein the operations further comprise:

determining that an obstacle is interposed when a component ratio between the preceding wave component and the delayed wave component satisfy a predetermined threshold condition.

19. The non-transitory computer readable medium according to claim 11, wherein the delayed wave component is one of a plurality of delayed wave components, and the determination is made based on a ratio between the preceding wave component and at least two delayed wave components.

20. The non-transitory computer readable medium according to claim 11, wherein the preceding wave component and the delayed wave component are extracted from predefined distance windows centered on a calculated distance.

21. A method for controlling a communication apparatus, the method comprising:

measuring a phase characteristic of a frequency of a propagation channel to and from another communication apparatus;

generating a time response characteristic from the phase characteristic, the time response characteristic including a waveform component; and performing a determination on whether or not an obstacle is interposed between the communication apparatus and the another communication apparatus on a basis of the waveform component of the time response characteristic, wherein the waveform component is one of a plurality of waveform components including a preceding wave component and a delayed wave component, and the determination is performed on a basis of a component ratio between the preceding wave component and the delayed wave component in the time response characteristic.

* * * * *